US006839200B2

(12) United States Patent
Takano et al.

(10) Patent No.: US 6,839,200 B2
(45) Date of Patent: Jan. 4, 2005

(54) COMBINATION PERPENDICULAR MAGNETIC HEAD HAVING SHIELD MATERIAL FORMED AT BOTH ENDS OF AN UPPER POLE OF A WRITE ELEMENT

(75) Inventors: Hisashi Takano, Hachioji (JP); Naoki Koyama, Kokubunji (JP); Hideo Tanabe, Higashimurayama (JP); Eijin Moriwaki, Hachioji (JP); Isamu Yuito, Ome (JP); Kazuo Shiiki, Kanagawa-ken (JP); Tsuyoshi Ohnishi, Katsuta (JP); Tohru Ishitani, Katsuta (JP); Toshio Kobayashi, Tokyo (JP); Hideo Todokoro, Tokyo (JP); Chiaki Ishikawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/687,754

(22) Filed: Oct. 20, 2003

(65) Prior Publication Data

US 2004/0080865 A1 Apr. 29, 2004

Related U.S. Application Data

(63) Continuation of application No. 10/340,785, filed on Jan. 13, 2003, which is a continuation of application No. 10/083,104, filed on Feb. 27, 2002, now Pat. No. 6,538,844, which is a continuation of application No. 09/598,491, filed on Jun. 22, 2000, now abandoned, which is a continuation of application No. 09/084,321, filed on May 26, 1998, now Pat. No. 6,111,723, which is a division of application No. 08/192,794, filed on Feb. 7, 1994, now Pat. No. 5,850,326, which is a continuation of application No. 07/683,719, filed on Apr. 11, 1991, now abandoned.

(30) Foreign Application Priority Data

Apr. 16, 1990 (JP) ............................................. 2-097659
Sep. 14, 1990 (JP) ............................................. 2-242340

(51) Int. Cl.[7] ........................... G11B 5/39; G11B 5/187
(52) U.S. Cl. ........................ 360/126; 360/122; 360/317
(58) Field of Search .................................. 360/122, 126, 360/317, 319

(56) References Cited

U.S. PATENT DOCUMENTS

| 4,325,093 A | 4/1982 | Ishii ............................ 360/120 |
| 4,796,126 A | 1/1989 | Tsuchiya et al. .......... 360/235.2 |
| 4,807,074 A | 2/1989 | Kamo ......................... 360/316 |

(List continued on next page.)

FOREIGN PATENT DOCUMENTS

| DE | 4020206 | 1/1991 |
| EP | 144150 | 6/1985 |
| EP | 340882 | 11/1989 |

(List continued on next page.)

OTHER PUBLICATIONS

IEEE Transaction on Magnetics, vol. 24, No. 6, Nov. 1984, pp. 2841–2843.
IBM Technical Disclosure Bulletin, vol. 31, No. 3, Aug. 1988, "Film Head Structure", Optimized for writing.
IBM Technical Disclosure Bulletin, vol. 24, No. 7A, Dec. 1981, p. 3197.

*Primary Examiner*—Jefferson Evans
(74) *Attorney, Agent, or Firm*—Mattingly, Stanger & Malur, P.C.

(57) ABSTRACT

In a composite magnetic head comprising a magnetoresistive read head including a magnetic thin film having a magnetoresistive effect and soft magnetic members interposing the soft magnetic film between them through a non-magnetic insulation layer, an induction type write head including poles formed in a moving direction of a medium and a conductor crossing the poles, and disposed in the proximity of the magnetoresistive head, and a substrate supporting these heads, the present invention discloses a composite magnetic head characterized in that part of a floating surface inclusive of the magnetic head constituent members has recesses and the read/write operations to and from the medium are effected by the portion interposed by these recesses.

2 Claims, 11 Drawing Sheets

U.S. PATENT DOCUMENTS

| | | | |
|---|---|---|---|
| 4,907,113 A | 3/1990 | Mallory | 360/112 |
| 4,939,604 A | 7/1990 | Fukuda et al. | 360/235.4 |
| 4,967,298 A | 10/1990 | Mowry | 360/317 |
| 4,974,106 A | 11/1990 | White et al. | 360/234.2 |
| 4,974,110 A | 11/1990 | Kanamine et al. | 360/126 |
| 4,975,794 A | 12/1990 | Losee et al. | 360/246.2 |
| 4,984,114 A | 1/1991 | Takeuchi et al. | 360/236.4 |
| 5,016,342 A | 5/1991 | Pisharody et al. | 29/603.15 |
| 5,019,930 A | 5/1991 | Takeya | 360/235.3 |
| 5,020,213 A | 6/1991 | Aronoff et al. | 29/603.12 |
| 5,079,662 A | 1/1992 | Kawakami et al. | 360/318 |
| 5,083,365 A | 1/1992 | Matsumoto | 29/603.12 |
| 5,105,529 A | 4/1992 | Yasar et al. | 29/603.04 |
| 5,116,719 A | 5/1992 | Gau | 430/313 |
| 5,168,409 A | 12/1992 | Koyama et al. | 360/317 |
| 5,181,149 A | 1/1993 | Katsumata et al. | 360/119 |
| 5,189,580 A | 2/1993 | Pisharody et al. | 360/126 |
| 5,218,497 A | 6/1993 | Tanabe et al. | 360/315 |
| 5,245,493 A | 9/1993 | Kawabe et al. | 360/126 |
| 5,285,340 A | 2/1994 | Ju et al. | 360/119 |
| 5,402,295 A | 3/1995 | Suzuki et al. | 360/126 |
| 5,404,260 A | 4/1995 | Machui et al. | 360/126 |
| 5,515,221 A | 5/1996 | Gill et al. | 360/126 |
| 5,541,793 A | 7/1996 | Schwarz | 360/121 |
| 5,612,843 A | 3/1997 | Packard | 360/123 |
| 5,663,856 A | 9/1997 | Packard | 360/122 |
| 5,675,461 A | 10/1997 | Aylwin et al. | 360/126 |
| 6,339,524 B1 | 1/2002 | Furusawa et al. | 360/317 |
| 6,342,993 B1 | 1/2002 | Sato | 360/319 |
| 6,393,692 B1 * | 5/2002 | Ju et al. | 29/603.14 |
| 6,618,227 B2 * | 9/2003 | Yano et al. | 360/317 |
| 2003/0231426 A1 * | 12/2003 | Sato | 360/126 |
| 2004/0100737 A1 * | 5/2004 | Nakamoto et al. | 360/319 |

FOREIGN PATENT DOCUMENTS

| | | |
|---|---|---|
| JP | 51-44917 | 4/1976 |
| JP | 52-14410 | 2/1977 |
| JP | 53-139515 | 12/1978 |
| JP | 57-044217 | 3/1982 |
| JP | 57-109120 | 7/1982 |
| JP | 58-115615 | 7/1983 |
| JP | 58-164135 | 9/1983 |
| JP | 58-212615 | 12/1983 |
| JP | 59-16115 | 1/1984 |
| JP | 59-71124 | 4/1984 |
| JP | 59-178609 | 10/1984 |
| JP | 60-126834 | 7/1985 |
| JP | 63-009008 | 6/1986 |
| JP | 63-9008 | 1/1988 |
| JP | 63-298808 | 12/1988 |
| JP | 63-317920 | 12/1988 |
| JP | 64-082312 | 3/1989 |
| JP | 1-189016 A | 7/1989 |
| JP | 1-211312 | 8/1989 |
| JP | 1277313 | 11/1989 |
| JP | 1296421 A | 11/1989 |
| JP | 01-311412 | 12/1989 |
| JP | 2-201710 A * | 8/1990 |
| JP | 11-86210 A * | 3/1999 |

* cited by examiner

PRIOR ART

COMBINATION PERPENDICULAR MAGNETIC HEAD HAVING SHIELD MATERIAL FORMED AT BOTH ENDS OF AN UPPER POLE OF A WRITE ELEMENT

This is a continuation application of U.S. Ser. No. 10/340,785, filed Jan. 13, 2003; which is a continuation application of U.S. Ser. No. 10/083,104, filed on Feb. 27, 2002, now U.S. Pat. No. 6,538,844; which is a continuation application of U.S. Ser. No. 09/598,491, filed Jun. 22, 2000, now abandoned; which is a continuation application of U.S. Ser. No. 09/084,321, filed May 26, 1998, now U.S. Pat. No. 6,111,723; which is a divisional application of U.S. Ser. No. 08/192,794, filed Feb. 7, 1994, now U.S. Pat. No. 5,850,326; which is a file wrapper continuation application of U.S. Ser. No. 07/683,719, filed Apr. 11, 1991, now abandoned. This application is related to U.S. Ser. No. 09/598,493, filed Jun. 22, 2000, now U.S. Pat. No. 6,278,578; and U.S. Ser. No. 09/598,492, filed Jun. 22, 2000, now U.S. Pat. No. 6,307,707.

BACKGROUND OF THE INVENTION

1. Field of the Invention

This invention relates to a magnetic head for use in magnetic recording and to a fabrication method thereof. An embodiment of the present invention relates particularly to a read/write magnetic head which is suitable for high density read/write operations.

2. Description of the Prior Art

A conventional magnetic head technology is disclosed in JP-A-59-178609, for example.

A magnetic head of the type in which only a head gap portion projects to a medium direction has been proposed in order to accomplish high density recording in magnetic recording. For example, "IEEE TRANSACTION ON MAGNETICS", Vol. 24, No. 6, November, 1984, pp. 2841–2843, describes a method of deciding a track width of a magnetic head by applying machining from an air bearing surface side.

As to a magnetoresistive head (hereinafter referred to as the "MR head") used as a read-only magnetic head, too, JP-A-59-71124 and JP-A-1-277313 disclose the structure in which only a track width portion (magnetic sensing region) is projected to a medium opposing surface.

On the other hand, a read/write magnetic head produced by integrating the MR head and an induction type write head is known from JP-A-51-44917, and so forth.

SUMMARY OF THE INVENTION

However, the magnetic head having the structure of the IEEE reference described above involves the problem that off-track performance is low because a flux leaks from regions other than the track width which is defined by etching. Since a relatively wide region of a slider rail is removed by etching, floating characteristics of a slider vary greatly before and after machining. If etching technique used for an ordinary semiconductor process is utilized, it becomes extremely difficult to coat uniformly a resist onto the slider rail, and the problem of mass-producibility is left unsolved.

The technology disclosed in JP-A-59-71124 and JP-A-1-277313 is not free from the following problem. When the MR head only the magnetic sensing region of which is allowed to project is produced, magnetic shield layers that interpose the MR sensor between them from both sides are greater than the width of projection, so that flux from adjacent tracks which cross one another through these shield layers results in noise. This invites the problem that a signal-to-noise ratio drops when signals become weaker with a smaller track width.

Furthermore, when a composite magnetic head is produced by combining the MR sensor only the magnetic sensitive region of which projects and the induction type write head, the width of the write magnetic pole and that of the projecting portion of the MR sensor deviate from each other due to a positioning error and the ratio of this deviation to the track width becomes greater with a smaller track width. Therefore, another problem occurs that read efficiency drops. In other words, the conventional MR head described above employs the structure wherein only the track width portion is projected to the medium opposing surface so as not to detect signals at portions other than at the read track width for the purpose of accomplishing a smaller track width. In the conventional head of this kind an MR sensor pattern only the track width portion which projects is formed on a substrate and a read head and the like are formed in such a manner as to align with this projecting portion. Thereafter the substrate is cut and the cut surface is polished in order to obtain a head only whose projecting portion is exposed to a medium opposing surface. Accordingly, the projecting width of the MR sensor and the width of shield layers and the width of the recording magnetic pole and the projecting with the MR sensor do not inevitably coincide with one another, respectively.

It is a first object of the present invention to provide a narrow track magnetic head having excellent off-track performance and a fabrication method thereof.

It is a second object of the present invention to provide a magnetic head having a high signal-to-noise ratio.

It is a third object of the present invention to provide a read/write magnetic head free from a positioning error between a write head and a read head but having a high signal-to-noise ratio.

It is a fourth object of the present invention to provide a fabrication method of a magnetic head which reduces the track width of a magnetic head without changing floating characteristics of a slider.

It is a fifth object of the present invention to provide a fabrication method of a magnetic head for high density recording having a narrow track width at a high fabrication yield.

The first object of the present invention described above can be accomplished by disposing at least one trench or groove at part of an air bearing surface between a magnetic head and a medium. More definitely, local recesses are defined near a magnetic gap of the magnetic head or its magnetic sensing region so as to define the width of these members. In one preferred embodiment of the invention, these trenches or recesses are formed by focused ion beam (hereinafter referred to as "FIB") machining. In another preferred embodiment of the invention, a material is packed into these trenches or recesses.

The second object of the invention described above can be accomplished by carrying out track width machining as a bulk from an air bearing surface side after an MR sensor and shield layers are formed on a substrate.

The third object of the invention described above can be accomplished by forming a write head and a read head on a substrate and then carrying out track width machining by etching from a polished and cut surface in order to prevent the track position error between the write head and the read head. In other words, while only the track width portion of a soft magnetic film of each of the write and read heads constituting the magnetic head is left on a floating surface, the other portions are removed in such a manner as to increase the distance from the medium. At the same time, track width machining is applied also to the shield layer of the read head so that only the projecting portion is exposed on the floating surface. In still another preferred embodiment of the present invention, a stopper material for etching is disposed in advance on a machining portion in a head lamination process in order to prevent the exposure of a planarization layer that covers the coil of the write head and a coil when machining is made from the floating surface.

The fourth object of the invention described above can be accomplished by machining part of a rail of an air bearing surface of a head slider by use of a focused ion beam.

The fifth object of the invention described above can be accomplished by machining the shape of the magnetic head by use of a beam having focused energy without coating a resist onto the slider rail.

When at least one trench is disposed at part of the air bearing surface of the magnetic head with the medium, a magnetic flux does not leak from regions other than from the track width region defined by the trench. Accordingly, a narrow track magnetic head having high off-track performance can be provided.

Yield and accuracy of machining can be improved by using a focused ion beam when the trench is formed only at part of the air bearing surface.

The leak of the flux can be reduced further by packing a material into the trench described above.

After the MR sensor and the shield layer are formed on the substrate, track width machining is carried out as a whole from the air bearing surface side with respect to the medium and in this manner, the width of the shield layer can be made substantially equal to the projecting width of the MR sensor. Accordingly, the flux from adjacent tracks does not mix through the shield layer, resulting in no noise, so that a magnetic head having a high signal-to-noise ratio can be obtained.

In the present invention, the distance between the members inclusive of the magnetic shield layer and the medium and between the magnetoresistive sensor and the medium, that is, the spacing, is great at the portions other than the projecting portion which functions as the magnetic sensing region. Accordingly, the signals from the portions other than the magnetic sensing region can be reduced remarkably. When a floating distance is 0.15 $\mu$m and a move-back distance is 2 $\mu$m, for example, a signal from adjacent tracks can be reduced by at least −50 dB with respect to a signal at a recording wavelength of 2 $\mu$m. Since the portions other than the magnetic sensing region are thus moved back, the noise resulting from the adjacent tracks can be reduced drastically.

Positioning of the track width between the write head and the read head can be made extremely precisely by carrying out track width machining of both of the heads simultaneously and as a bulk. If an etching stopper is used, an etching margin can be increased even when FIB is not used.

If the projecting portion is formed by utilizing focused ion beam etching (FIB) or if a method which defines a trench at part of the slider rail of the head is employed, a trench having a large aspect ratio can be formed in a very small region. Consequently, machining does not exert adverse influences on the floating characteristics of the slider.

If the shape of the magnetic head is machined by a beam having focused energy without coating a resist onto the slider rail, a desired shape can be machined at a high yield. Furthermore, since an electrically conductive layer can be formed inside the trench thus formed, a magnetic shield material can be packed easily into the trench by field plating or the like, and a head having high off-track performance can be fabricated.

DESCRIPTION OF THE PREFERRED EMBODIMENTS

Embodiment 1

Figure 1:
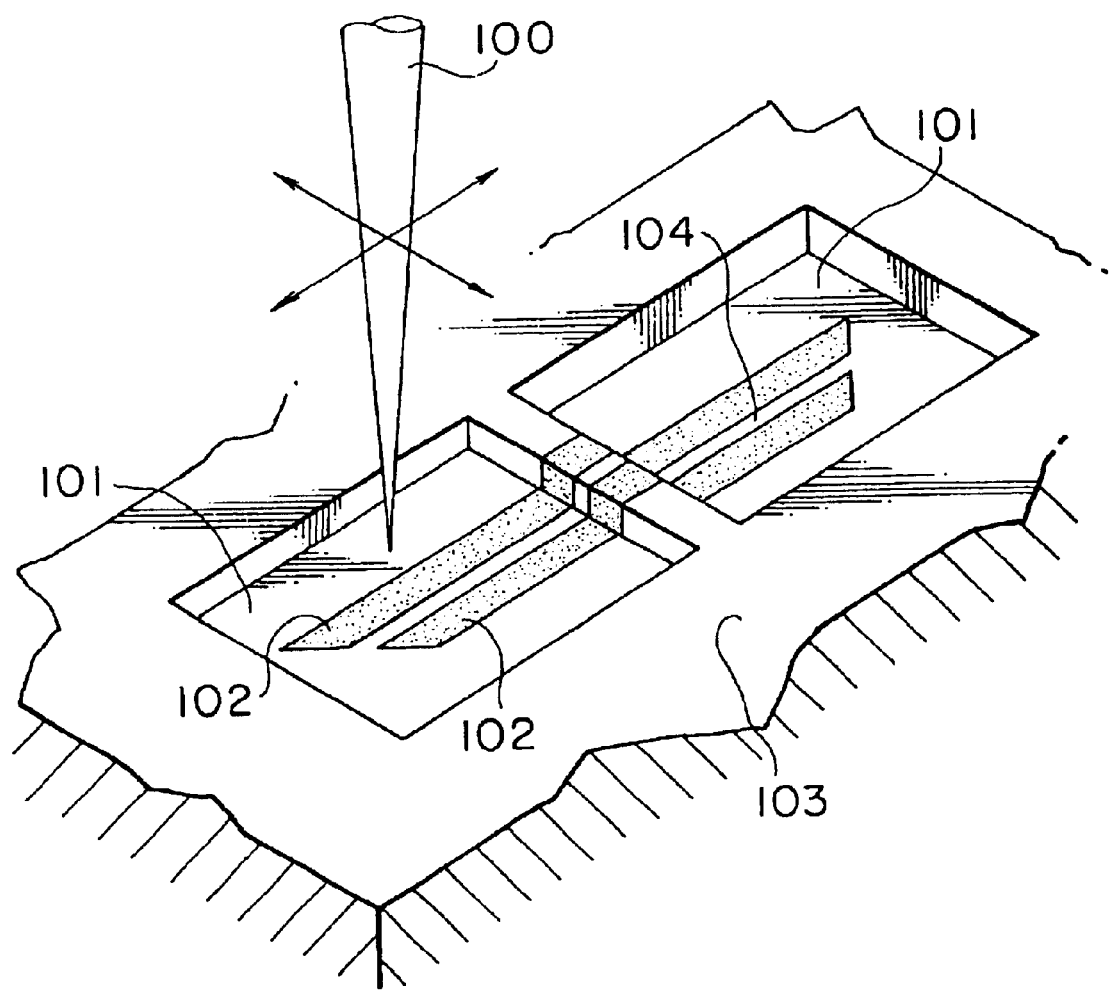
FIG. 1 is a perspective view of a magnetic pole portion of a head in accordance with the present invention.

This embodiment represents a fabrication method of a magnetic head in accordance with the present invention and the result of studies on read/write characteristics. FIG. 1 is a perspective view of the pole portion of an induction type thin film head after machining by a focused ion beam etching process (hereinafter referred to as "FIB") when it is observed from an air bearing surface side. The material of a pole 102 is a permalloy having a saturation flux density of 1.0 T, and a gap layer 104 and a protective layer 103 are made of alumina. The material of a slider 101 is zirconia. The track width of the magnetic head before FIB machining is 10 μm and the pole thickness is 1.5 μm at an upper part and 1.0 μm at a lower part. Since zirconia used as the slider material of the head this time is a non-conductive material, the sample undergoes charge-up during FIB machining and a trench cannot be formed accurately. Therefore, a ultra-thin layer of Au is formed on the slider surface by evaporation before FIB machining. Incidentally, this Au evaporation layer can be removed by ordinary ion-milling or by polishing after FIB machining. On the other hand, evaporation becomes unnecessary when a system which irradiates an electron beam during FIB machining and neutralizes charge-up is utilized. FIG. 1 shows a sample having a track width of 1 μm at both upper and lower parts and a machining depth of 2.0 μm after FIB machining. The ion seed of the ion beam 100 used for machining is GaIn and an acceleration voltage and a beam current are set to 30 kV and 1.6 nA, respectively. The beam diameter at this time is 0.2 μm.

Embodiment 2

Figure 2:
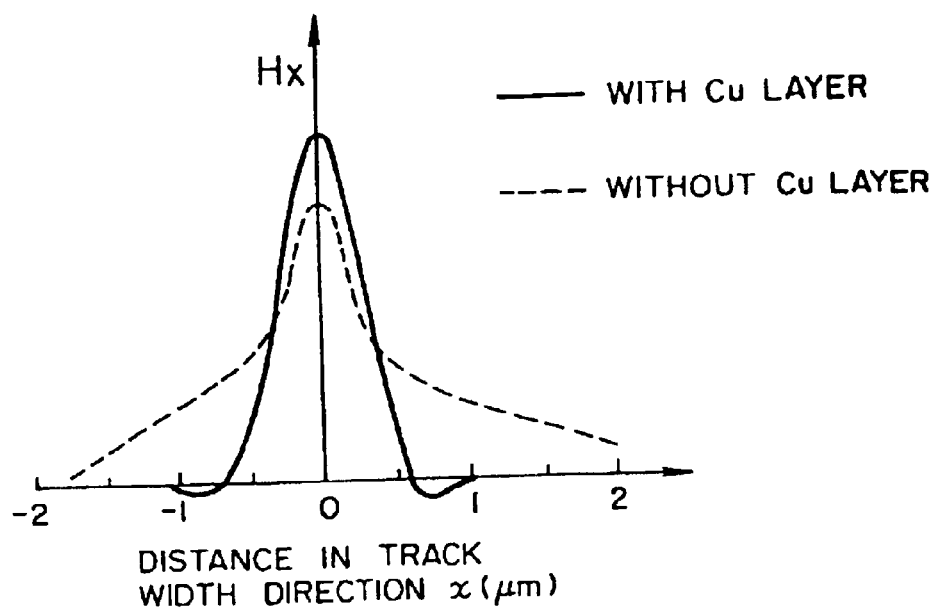
FIG. 2 is a diagram showing the field distribution of the magnetic head of the present invention.
Figure 3:
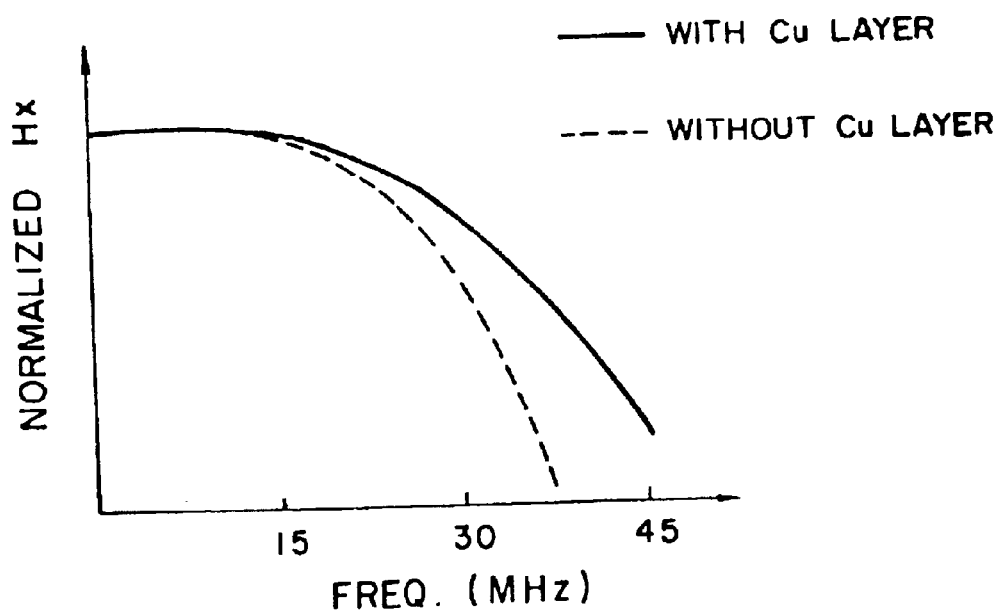
FIG. 3 is a diagram showing the frequency dependence characteristics of Hx of the magnetic head of the present invention.

A non-magnetic metallic material having a low specific resistivity such as Cu is packed into the trench portion formed by FIB machining and a flux leaking from portions other than from the track portion defined by machining can be reduced particularly in a high frequency range by utilizing an eddy current loss. This sample can be produced by a method which carries out FIB machining in a $W(CO)_6$ atmosphere to form a W layer in the region to which FIB is irradiated, and conducts field plating by utilizing this conductive layer to form Cu. Besides this method, the sample can be produced by another method which uses Al having high conductivity, or the like, as the ion seed and forms a Cu layer by field plating utilizing the ion injection layer which is formed at the trench portion of the sample by FIB machining. Here, the differences in the field distribution and field intensity between the thin film head having the Cu layer, which is a magnetic shield layer and is formed at the trench portion after FIB machining and a thin film head having the trench portion under the as-formed state are measured by an electron beam computerized tomography utilizing a Lorentz effect of an electron beam. FIG. 2 shows the result when the distribution of a longitudinal magnetic field Hx of the field distribution to be measured at 30 MHz in the track width direction is measured at the center position of the gap. The track width of the head after machining is set to 1 μm in each sample. It can be understood from this result that the leakage flux leaking from the regions other than from the track can be reduced drastically by forming Cu as the shield layer at the trench portion. The effect of this shield layer becomes greater with a higher frequency. Incidentally, the machining depth of the head used this time for the measurement is 2 μm but the leakage field of the heads not having the Cu layer formed thereon hardly changes even when the machining depth is made greater than the value described above. On the other hand, FIG. 3 shows the result when the frequency dependence of the maximum value of Hx is measured at the center position of the head magnetic pole, that is, the gap, and at the center position of the track. It can be understood from this diagram that the effect of the Cu shield layer becomes higher for the field intensity, too, with a higher frequency.

Embodiment 3

Figure 4:
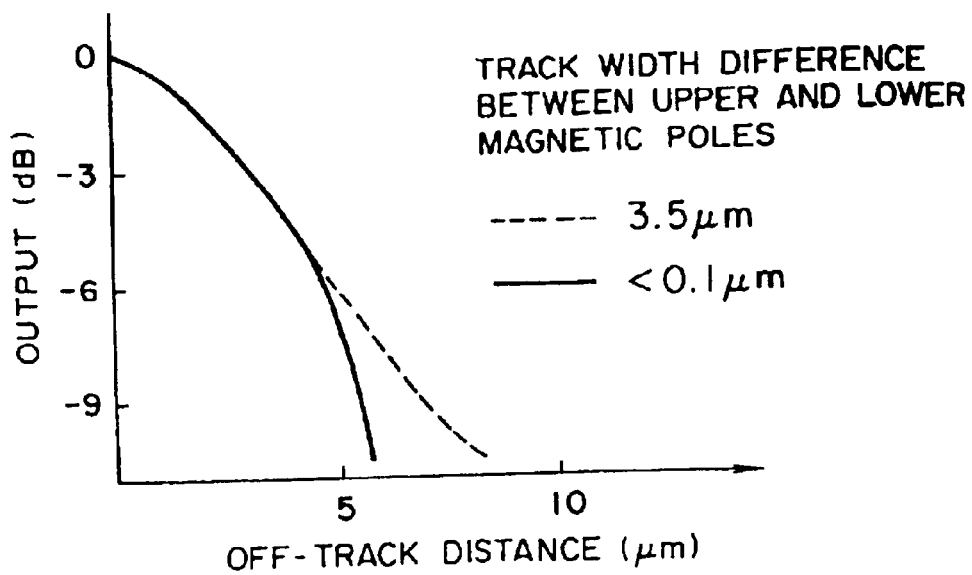
FIG. 4 is a diagram showing comparatively off-track performance of the magnetic head of the present invention and off-track performance of a conventional magnetic head.

FIG. 4 shows the result of comparison of off-track performance between a self read/write thin film head whose track width is not coincident between the upper pole and the lower pole and which is fabricated by the process of JP-A-59-178609, for example, and a thin film head obtained by subjecting this head to FIB machining so that the track width of the upper pole is coincident with the track width of the lower pole with 0.1 μm accuracy. The track width of the upper pole is 10 μm and the track width of the lower pole is 13.5 μm before FIB machining, and the track width is 10±0.05 μm for both poles after FIB machining. In this experiment, too, the Cu layer is formed at the trench portion of the slider rail machined by FIB. A spatter material having a coercive force of 1,500 Oe and a film thickness of 0.06 μm is used for the measurement and the spacing is 0.1 μm. The recording density is set to 50 kFCI (Flux Change per Inch). It can be understood from the result shown in FIG. 4 that the effect of alignment of the track edge portions of the upper and lower poles becomes remarkable when the off-track distance exceeds the half of the track width, and is effective for narrowing a track pitch. In this case, no change is observed in the read output and overwrite performance before and after machining.

Embodiment 4

Figure 5:
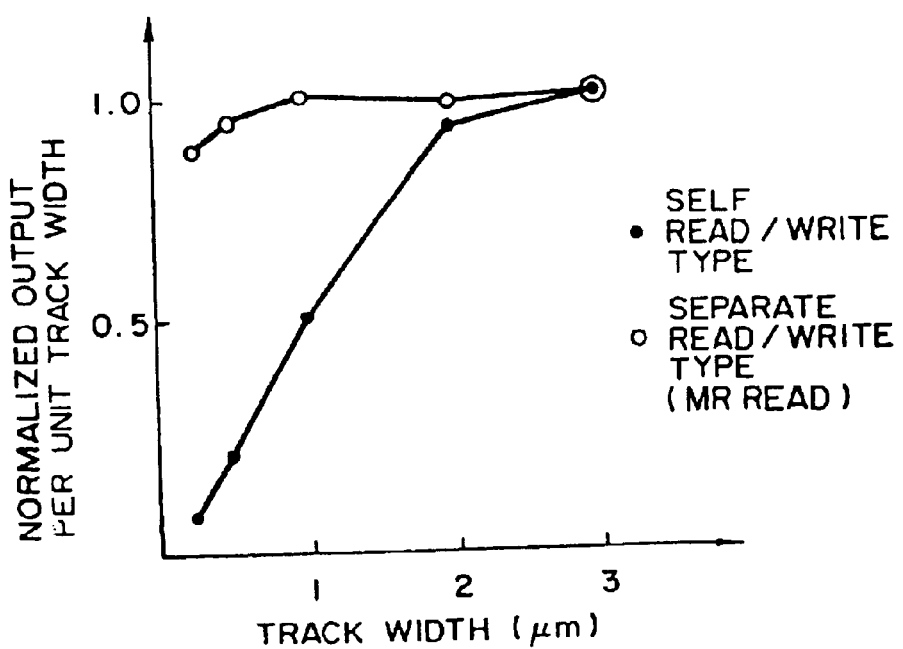
FIG. 5 is a diagram showing the relation between the change of a read output of the magnetic head of the present invention and a track width.

Next, the change of the read output per unit track width is measured by reducing the track width from 10 μm to 0.25 μm under the state where the dimensional difference of the track width between the upper and lower poles is kept below 0.1 μm. The result is shown in FIG. 5. The measuring condition and the medium are the same as those used in FIG. 4. Here, the self read/write thin film head and the read/write head using an MR head for reading are used. The machining depth of FIB is set to 2.0 μm for both heads. It can be understood from the result shown in FIG. 5 that when the track width is below 3 μm in the self read/write head, a drop in the read output is observed and this output drops to the half of the original read output (the read output of the head having a 10 μm track width) at the track width of 1 μm. It has been confirmed by the observation with a Lorentz microscope of the recording track written by the head of each track width that even when the track width of the head is 0.25 μm, the medium is recorded uniformly in the track width-wise direction in response to the track width of the head. It is therefore believed that the cause of the drop of the read output when the track width is reduced below 3 μm results primarily from the drop of the read sensitivity of the head. In the read/write head using the MR head for reading, on the other hand, the drop of the read output is not observed even when the track width is reduced down to 1 μm and it is found that at least 80% of the original output is obtained even when the track width is reduced down to 0.25 μm. It has thus been confirmed that in the head having the track width of 3 μm or below, the read/write head having the separate write and read heads is effective.

Embodiment 5

Figure 6:
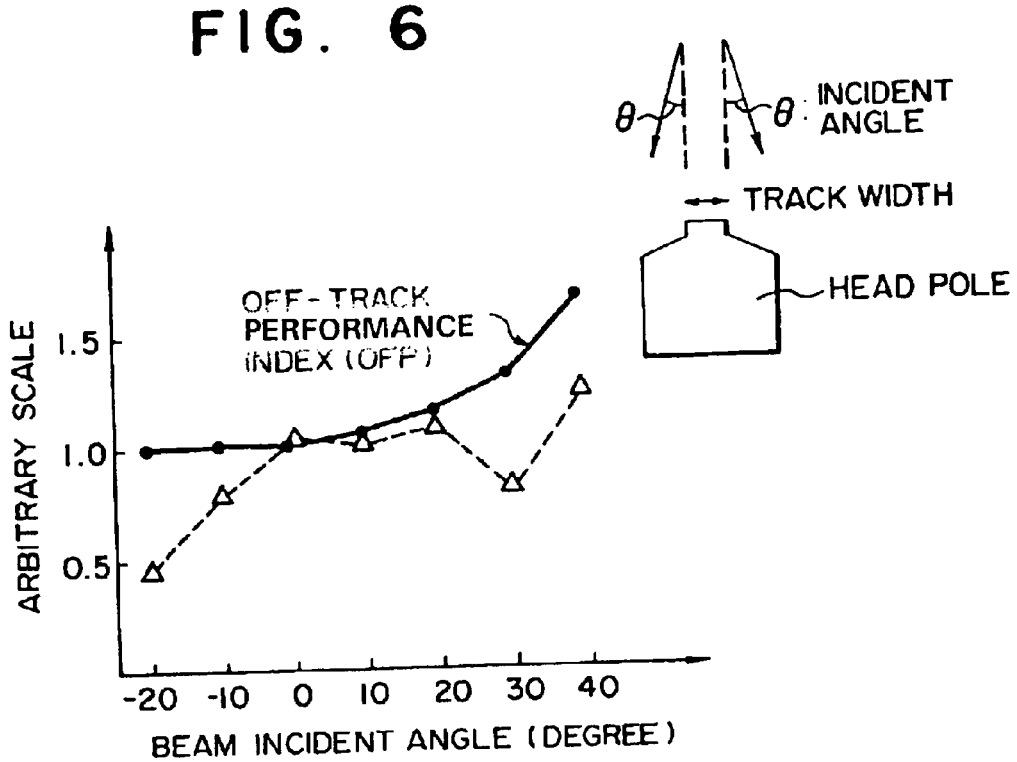
FIG. 6 is a diagram showing the relation between an incident angle of FIB used in the fabrication method of the present invention and off-track performance.

Next, FIG. 6 shows the result of the examination of the changes of the read output and off-track performance of the magnetic head which is machined by changing the incident angle of FIB. The track width after FIB machining is 3 μm and the machining depth is 2 μm. The medium used for the measurement of the read/write characteristics and the measuring condition are the same as those used in FIG. 4. The abscissa in FIG. 6 or in other words, the incident angle θ of the ion beam, represents the deviation from a direction perpendicular to the air bearing surface of the head, and is set so that when the right-hand and left-hand portions of the track are machined, the incident angles are symmetric with respect to the track center, respectively. Here, an off-track performance index OFP is used as an index for evaluating off-track performance. This OFP is defined as follows:

$$OFP=x/(Tw/2)$$

Here, symbol X represents the off-track distance when the read output drops by 6 dB from the initial value when the head is tracked off and Tw is the track width of the head after FIB machining. It can be understood from this diagram that off-track performance gets deteriorated when the incident angle is 10° or more, whereas the read output drops at 0° or below and gets unstable at 20° or more. It can be understood from this result that the incident angle of the beam is set preferably from 0° to about 10°. In this embodiment the shape of the head is set to an arbitrary shape by changing the incident angle of FIB, but machining of the head having an inclination at the track edge portion becomes possible by changing two-dimensionally the irradiation quantity or devising a peculiar polarization method even when the incident angle is 0°.

Embodiment 6

Figure 7:
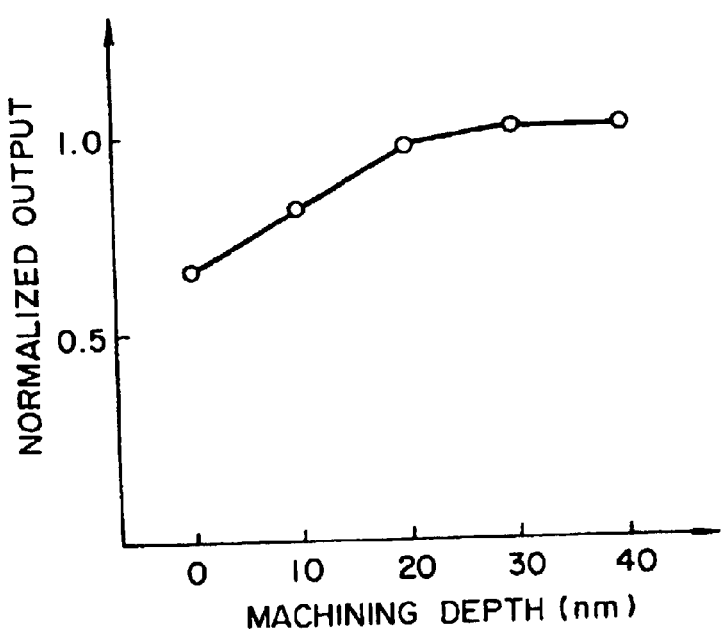
FIG. 7 is a diagram showing the change of read/write characteristics when portions other than the magnetic poles of a slider rail are machined uniformly by FIB.

FIG. 7 shows the result of the examination as to to which extent the read/write characteristics change when the portions other than the pole portion of the head slider rail are cut off uniformly by FIB after completion of a polish work. In the polishing process of the air bearing surface of an ordinary thin film head, a machining step of about 20 to about 30 nm is defined between the slider rail and the magnetic film of the pole. This machining step is eliminated by cutting off the slider rail. Since the surface property of the slider rail changes hardly by FIB machining, it has been confirmed that floating characteristics of the slider does not at all change before and after this machining. The medium and measuring condition used for the read/write characteristics are the same as those described already. As a result of this FIB machining, it has been confirmed that the read output can be improved by about 16% at a recording density of 50 kFCI by cutting off uniformly the portions other than the pole portion of the slider rail by about 30 nm.

Embodiment 7

Figure 8:
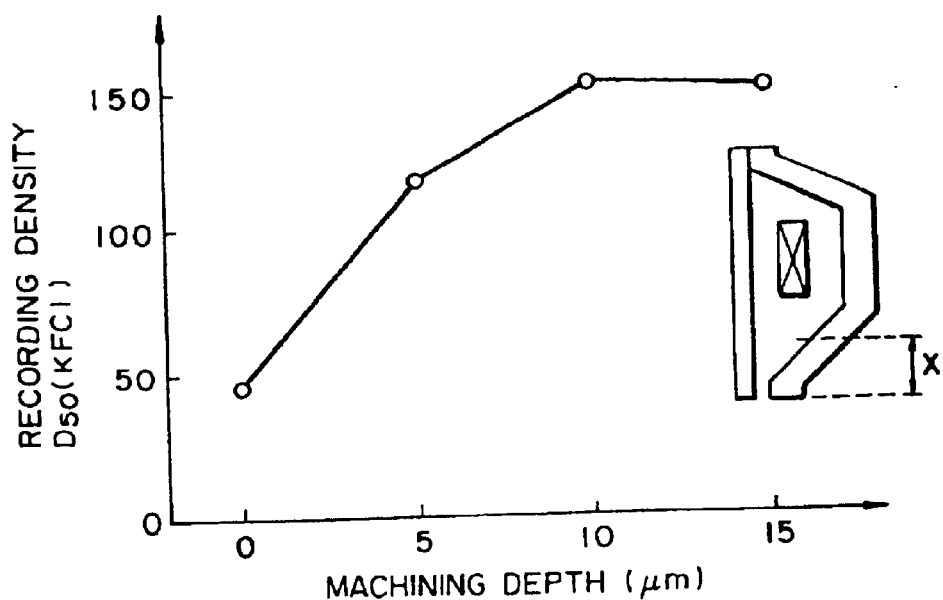
FIG. 8 is a diagram showing the write characteristics of a vertical head obtained by the present invention.

An ordinary thin film head for in-plane recording can be modified to a single pole vertical head by utilizing FIB machining; hence, this embodiment represents an example of such a modification. This machining cuts off only the upper pole of an ordinary thin film head for in-plane recording to a certain extent. FIG. 8 shows the result of the examination of the vertical recording characteristics of the pseudo-single pole vertical head obtained by this machining. The coil used hereby is buried in an alumina layer. The medium used for measurement is a two-layered film medium of CoCr and permalloy and the spacing is set to 0.05 μm. Incidentally, a separate vertical head is used for reading from the relation of the pole thickness. It has been confirmed from this result that the recording density characteristics can be improved because the recording mode changes from the in-plane mode to the vertical mode when the machining depth of the upper pole is increased. Here, a single pole head that can be used for both reading and writing can be fabricated by use of a photoresist pattern for an ordinary thin film head for in-plane recording by optimizing the thickness of the upper and lower poles, respectively. In this manner the head for in-plane recording can be converted to a head for vertical recording by utilizing FIB machining.

Embodiment 8

Figure 9A:
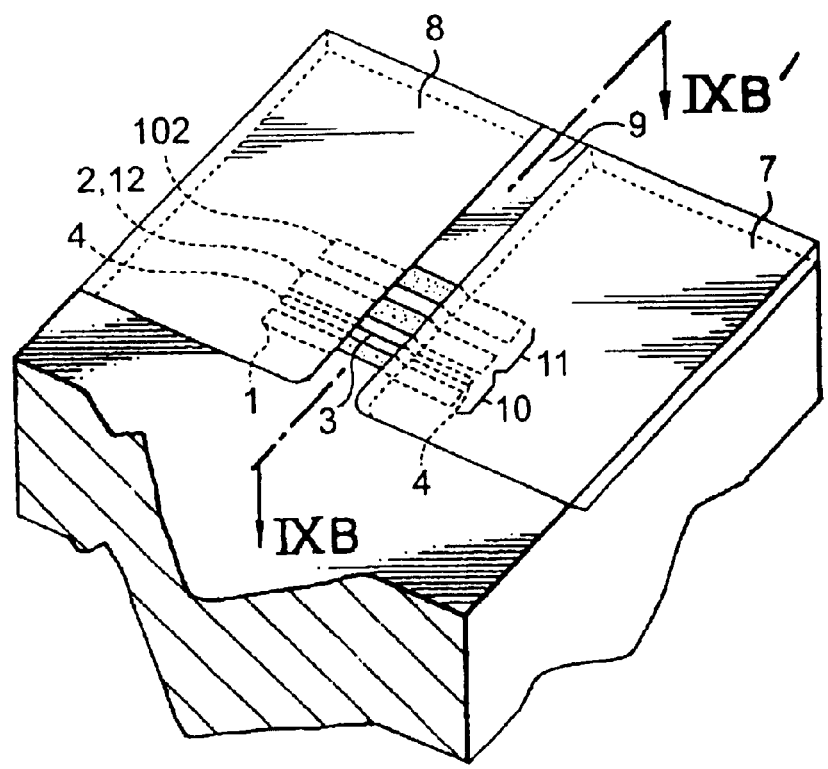
FIGS. 9A and 9B are perspective views showing the portions near a gap portion of the magnetic head of the present invention.
Figure 9B:
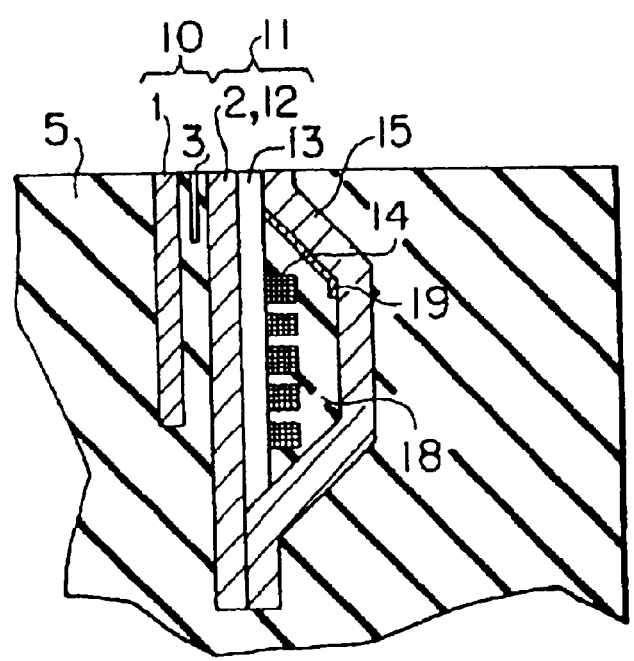

Another embodiment of the present invention will be explained with reference to FIGS. 9A and 9B. FIG. 9A is a perspective view of a read/write head when viewed from the floating surface side and FIG. 9B is a sectional view taken along line A–A' in FIG. 9A. As can be seen from these drawings, the head in accordance with this embodiment is provided with a write head 11 at the back of a read MR head 10. The pole 12 on one of the sides of this write head serves also as one of the shield layers 2 of the MR head. The structure of the MR head is as follows. A magnetoresistive sensor 3 and an electrode 4 for causing a current to flow are disposed between two soft magnetic members 1, 2 that serve as the magnetic shield layer. First of all, a permalloy pattern which is 2 μm thick and is a first shield layer 1 is formed on an alumina titanium carbide substrate 5 on which an insulation layer made of alumina is laminated. The shape of this first shield layer 1 is rectangular. Next, an MR sensor 3 is formed through the insulation layer. This insulation layer uses alumina. This embodiment uses a shunt bias method as a method of application of a bias magnetic field which is necessary for operating the MR sensor. Therefore, a 0.1 μm-thick titanium film is laminated continuously as a shunt film on a 40 nm-thick permalloy film and then the rectangular MR sensor pattern is formed by photo-etching. Thereafter, a 0.2 μm-thick copper electrode 4 is formed on both sides except for the portion which will serve as a magnetic sensitive region. Next, a second shield pattern 2 is formed through an insulation layer. This shield pattern serves also as a first write pole 12. A Co system amorphous soft magnetic film having a greater saturation flux density than permalloy is used in order to obtain a greater write field. The film thickness is 2.5 μm. Alumina having a film thickness of 1 μm is used for a gap layer 13. A coil 14 has five turns of copper having a film thickness of 3 μm. An etching 17 is then applied onto a slope portion on the floating surface side of a planarization layer through an insulation layer 16. Subsequently, a second write pole 15 is formed by use of a Co system amorphous soft magnetic film having a film thickness of 2 μm in the same way as the first pole and then a protective film is laminated. The substrate is thereafter cut and polishing of the floating surface is conducted.

Part of the floating surface other than the portion which will become a magnetosensitive region is removed during the polishing step by photo-etching technique which is employed ordinarily. First of all, an about 3 μm-thick photoresist is coated on the floating surface and a desired resist pattern is obtained by effecting exposure. Recesses 7 and 8 are formed by use of this resist pattern as a mask by ion milling which uses an Ar gas, in such a manner as to project the magnetosensitive region 9. Both of the MR head and write head portions are shaped so that the width of the projecting portion 9 is 3 μm and they are positioned on the same track.

In order to obtain a head having high read efficiency in the process described above, it is preferred to project only the MR sensor portion which is not short-circuited by the electrode. To accomplish this object, the electrode pattern and the pattern for forming the projecting portion must be registered with a high level of accuracy at the time of exposure and a narrow pattern is preferably disposed in the electrode layer so that a registration marker is exposed on the floating surface. Furthermore, the width of the portion at which the electrode is not disposed, or in other words, the gap between the electrodes, is preferably greater than the width of projection in order to secure a registration margin. In this embodiment the gap between the electrodes is 4 μm and the width of the projecting portion is 3 μm.

The embodiment described above uses the photoresist as the mask for ion milling but can also use a metal mask or a carbon mask by use of a multi-layered resist method and a selective etching method.

Figure 10:
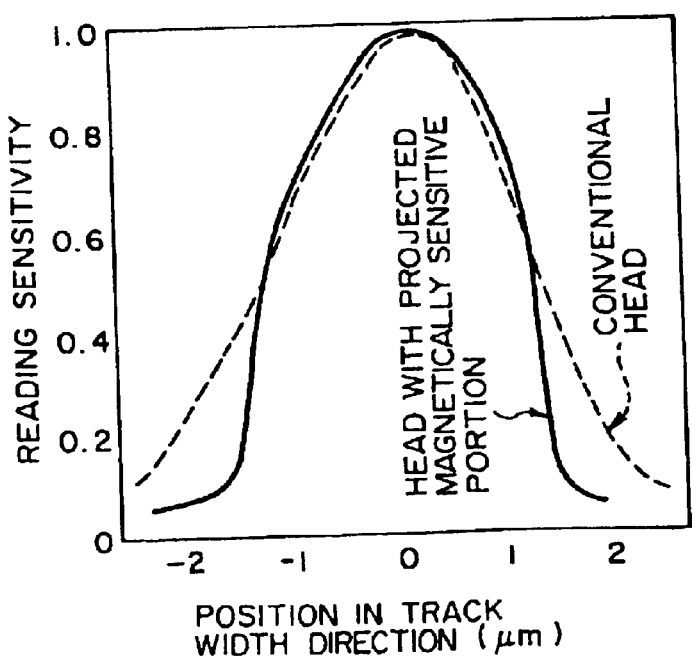
FIG. 10 is a diagram showing the sensitivity distribution of an MR head in the direction of a track width.

FIG. 10 shows the sensitivity distribution (solid line in the drawing) of the head described in this embodiment in the track width direction in comparison with the sensitivity distribution (dash line) of the head not having the projecting portion defining the track width between the electrodes at both ends in accordance with the prior art structure. The drop of the sensitivity of the head at the track edge is sharper in the head of the embodiment of the invention and this represents that influences from adjacent tracks are smaller.

As described above, the projecting portions of both the write and read heads can be formed simultaneously and accurately by carrying out etching from the floating surface, so that a position error does not occur between the read and write heads and a read operation can be made efficiently.

Though the embodiment described above uses the Co system amorphous material as the pole material, other high saturation flux density materials such as Fe system crystalline materials can be used, too. Though the width of the write head in the track width direction before the recesses are formed is equal to the width of the shield layer of the MR head, the former may be different from the latter so long as it is greater than the width of the projecting portion.

Embodiment 9

Figure 11A:
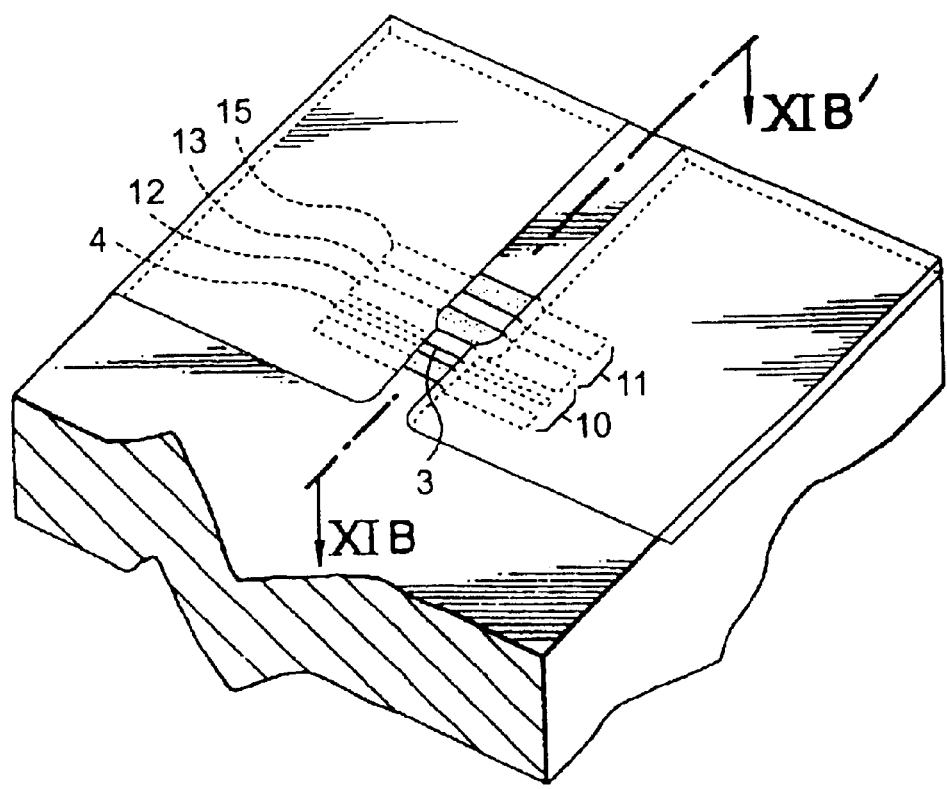
FIGS. 11A and 11B are perspective views of a read/write composite head in accordance with another embodiment of the present invention.
Figure 11B:
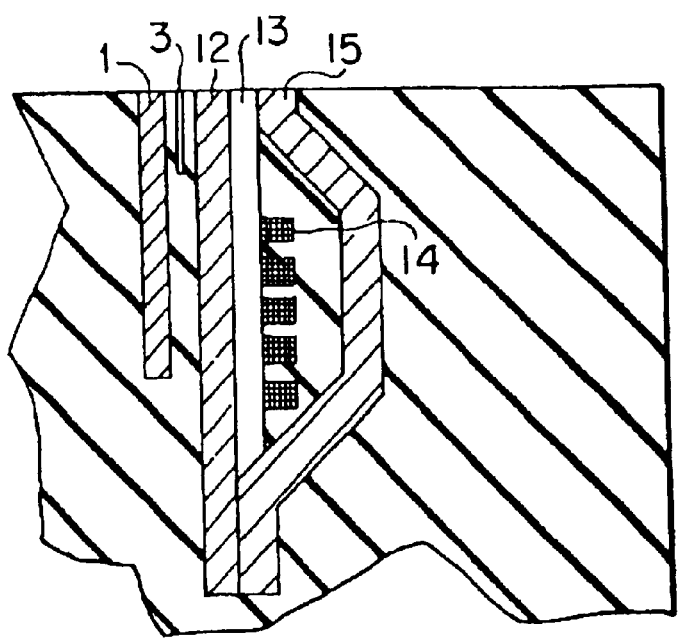

Still another embodiment of the invention will be explained with reference to FIGS. 11A and 11B. This embodiment is substantially the same as the first embodiment and has a write head at the back of the MR head. However, the width of the projecting portion of the write head is 4 μm, the width of the projecting portion of the MR head is 3 μm and the width of the read head is made smaller. If there is any positioning error of the heads, the influences of noise from the adjacent tracks becomes smaller when the read operation is made from a track having a smaller track width than the width of the written track, as is well known in the art. The track width can be changed easily by changing the projecting width of the read/write heads by carrying out etching from the floating surface as is made in this embodiment. Accordingly, a magnetic head having suitable read/write track width can be fabricated easily.

All the foregoing embodiments use the shunt bias method as the method of application of the bias field to the MR head but the present invention is not particularly limited thereto and can employ heretofore known permanent magnet bias, soft-film bias, exchange coupled film bias using a ferrodimagnetic film, and so forth.

Embodiment 10

Figure 12A:
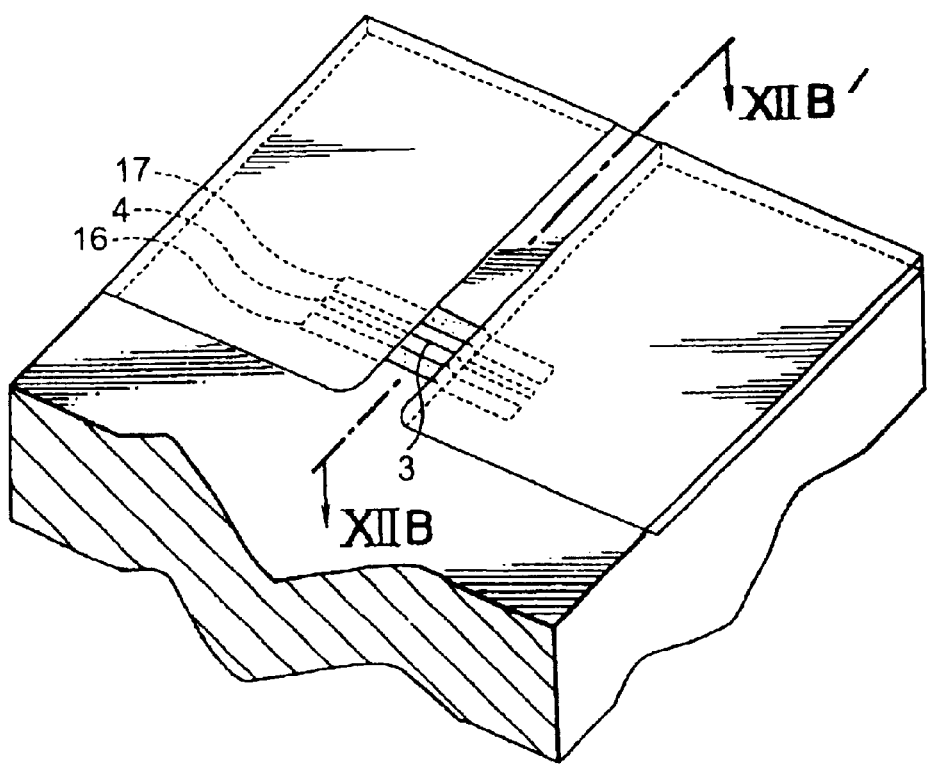
FIGS. 12A and 12B are perspective views of a read/write composite head in accordance with still another embodiment of the present invention.
Figure 12B:
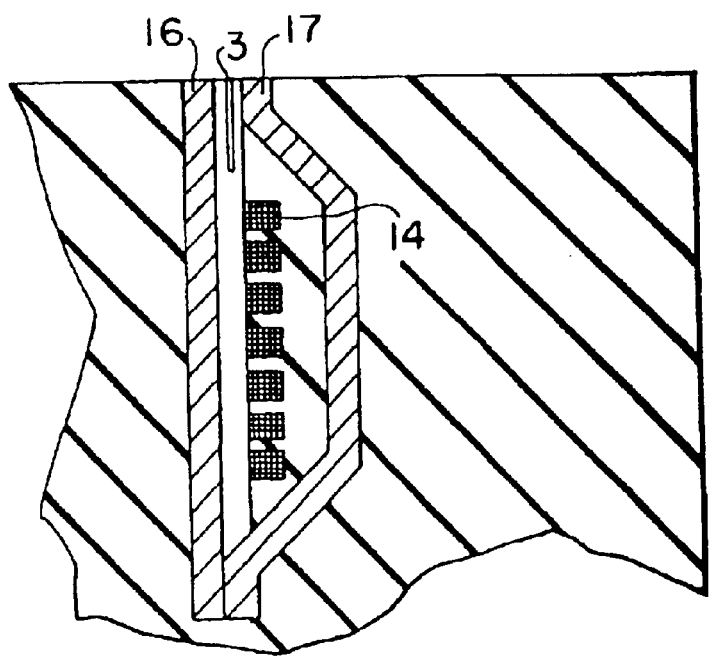

Still another embodiment of the present invention will be explained with reference to FIGS. 12A and 12B. In this embodiment the MR sensor 3 is disposed between the poles 16 and 17 of the write head. The pole serves also as the shield film of the MR head. In the drawings, the pole uses a Co system amorphous magnetic film having a high saturation flux density and the film thickness is 2 μm. The bias field is applied to the MR sensor by causing a D.C. current to flow through the write coil. For this reason, the MR sensor is not provided with the shunt film but comprises only the permalloy and the electrodes. The bias field can be applied more easily if the MR sensor is disposed at a position deviated from the center between the poles and in this embodiment, the ratio of distance between the poles and the sensor is set to 1:2. The rest of the structure of the head and the machining method of the projecting portion of the floating surface are the same as those described in the foregoing embodiments.

According to this embodiment, the MR sensor is disposed between the write poles and the write poles serve also as the shield layer. Therefore, the width of the write pole shield layer coincides with the width of the projecting portion of the MR sensor and there can thus be obtained a magnetic head free from the positioning error between the read and write tracks.

The embodiments Nos. 8, 9 and 10 represent the structure in which part of the write pole serves also as the shield layer of the MR head but the present invention can also be used for a write/read head in which the write poles and the shield layers are separated completely.

Embodiment 11

Figure 15:
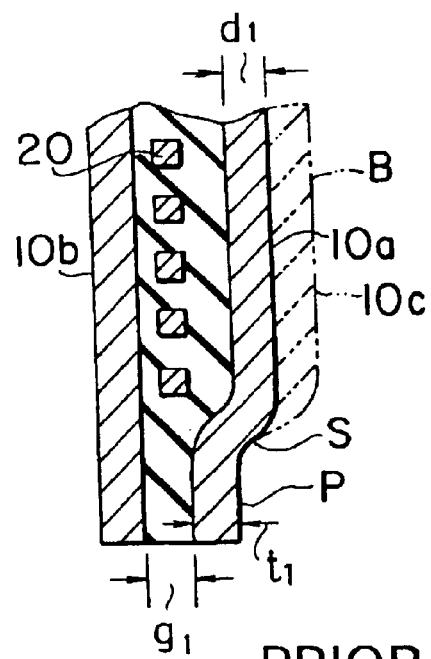
FIG. 15 is a sectional view of a conventional magnetic core when viewed in the same way as in FIG. 14.

FIG. 15 shows an example of the section of the magnetic core portion in a conventional thin film magnetic head. As shown in the drawing the thin film head comprises a magnetic core consisting of an upper magnetic film 10a and a lower magnetic film 10b and a conductive layer coil 20 sandwiched between these films. The write/read operation is made when the pole portion P at the tip of the core travels while opposing a medium.

Each of the magnetic pole film and coil is formed by depositing a magnetic layer and a conductive layer on a substrate by spattering, or the like, and then carrying out patterning by ion milling, or the like.

The magnetic core comprises the pole tip P that opposes perpendicularly the magnetic recording medium, the slope portion S from which the gap between the upper and lower magnetic films starts expanding gradually and the back region B which is disposed through the conductor layer. In order to improve read/write efficiency of the head and to prevent magnetic saturation, the back core B has preferably a sectional area which is as great as possible and in order to effect high density read/write operations, the sectional area of the tip of the pole is preferably as small as possible. As to the planar shape, a design has been made so that the magnetic film of the back core B expands gradually with respect to the rectangular pole tip portion P having a width substantially equal to the track width opposing the medium, as disclosed in JP-A-55-84019.

In conjunction with the sectional structure, a method of preventing magnetic saturation has been proposed by laminating further a magnetic film 10c on the upper magnetic film 10a as indicated by dash line in FIG. 15 so as to enlarge the sectional area of the back core region. Since the slope portion S has an inclination, however, it is difficult to superpose completely the magnetic film 10c on S and P while leaving only the pole tip α on the medium opposing surface. Therefore, the thickness of the upper and lower magnetic films 10a and 10b must be increased in order to prevent magnetic saturation at the tip regions P and S which are believed to affect greatly read/write efficiency.

In accordance with the prior art technology described above, the film thickness $d_1$ of each of the magnetic films 10a and 10b is uniform in the back region B, on the slope portion S and in the tip region P. For this reason, the prior art technology involves the problem in that if the thickness of the pole magnetic film is increased for accomplishing the object described above, the width $t_1$ at the pole tip becomes great, as well. In other words, even when the magnetic bias $g_1$ is reduced, $t_1$ cannot be reduced, so that a sharp field cannot be generated from the tip of the pole and there is an inevitable limit to the improvement in recording density.

The object of this embodiment is to improve the magnetic core shape of the head in order to make the read/write operation in a high density, with high resolution and moreover, efficiently.

This object can be accomplished by cutting off the side surface of the upper and lower pole magnetic films opposite to the magnetic gap and reducing the film thickness at the pole tip without changing the magnetic gap width.

Figure 14:
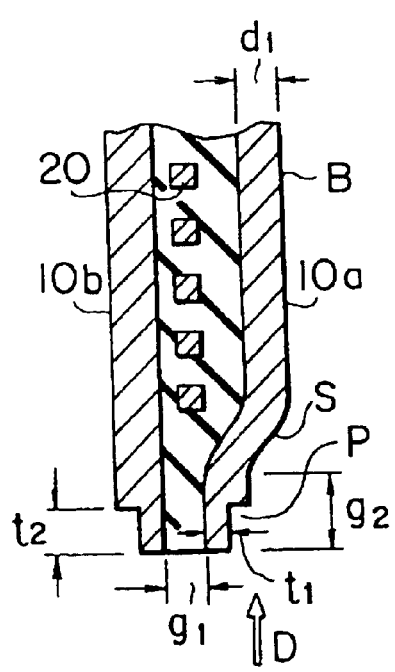
FIG. 14 is a sectional view taken along line A–A' of the magnetic core shown in FIG. 13.

In FIG. 14, the film thickness $d_1$ of the back region B of the pole magnetic film is 1 μm, for example, and the film thickness $t_1$ of the tip region P on the medium opposing surface side is 0.5 μm, for example. The film thickness is sufficiently great in the back region B, the slope portion S and the region of the tip P on the S side, and magnetic saturation does not occur. At the same time, a sharp field is generated from the medium opposing surface of the tip to conduct high density recording. Accordingly, read resolution can be improved and high efficiency and high density magnetic recording become thus possible.

Figure 13:
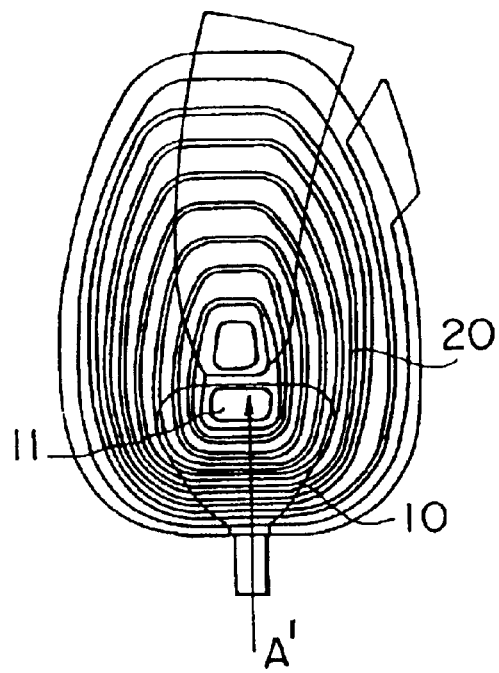
FIG. 13 is a plan view of a thin film magnetic write head in a first embodiment of the present invention.

FIG. 13 is a plan view of a thin magnetic film head showing still another embodiment of the present invention. Reference numeral 10 represents a magnetic core obtained by patterning a permalloy or amorphous magnetic film, which is formed on a substrate by spattering or the like, by ion milling using a photoresist as a mask. Reference numeral 20 represents a conductor coil. Upper and lower magnetic layers of the magnetic core come into mutual contact at 11 and define a yoke structure and the conductor coil 20 interposed between these upper and lower magnetic layers is completely insulated by a resin insulation layer.

FIG. 14 is a sectional view taken along line A–A' of the magnetic core shown in FIG. 13. This embodiment uses the amorphous alloy for the magnetic film. The upper magnetic film 10a comprises the pole tip P which opposes perpendicularly the magnetic recording medium, the slope portion S from which the gap between the upper and lower magnetic films starts expanding gradually and the back region B disposed through the conductor layer. The film thickness $d_1$ of the upper and lower magnetic films in the head back region B is 1.0 μm and the length of the pole tip P corresponding to the gap length is $g_1$=0.5 μm. The gap depth is $g_2$=0.8 μm. A focused ion beam (FIB) is irradiated from the direction represented by arrow D in parallel with the arrow so as to etch the pole tip to a film thickness of $t_1$=0.5 μm. The etching depth from the medium opposing surface is $t_2$=0.5 μm so that the pole film thickness changes at a position close to the medium from the slope portion S. Etching with about ±0.1 μm accuracy becomes possible in both directions of width and depth by use of FIB. Such a core does not cause magnetic saturation at portions other than part of the tip P at which the film thickness is small and at the same time, a sharp field can be generated from the tip. Accordingly the read/write operation can be made highly efficiently with high resolution.

Figure 18:
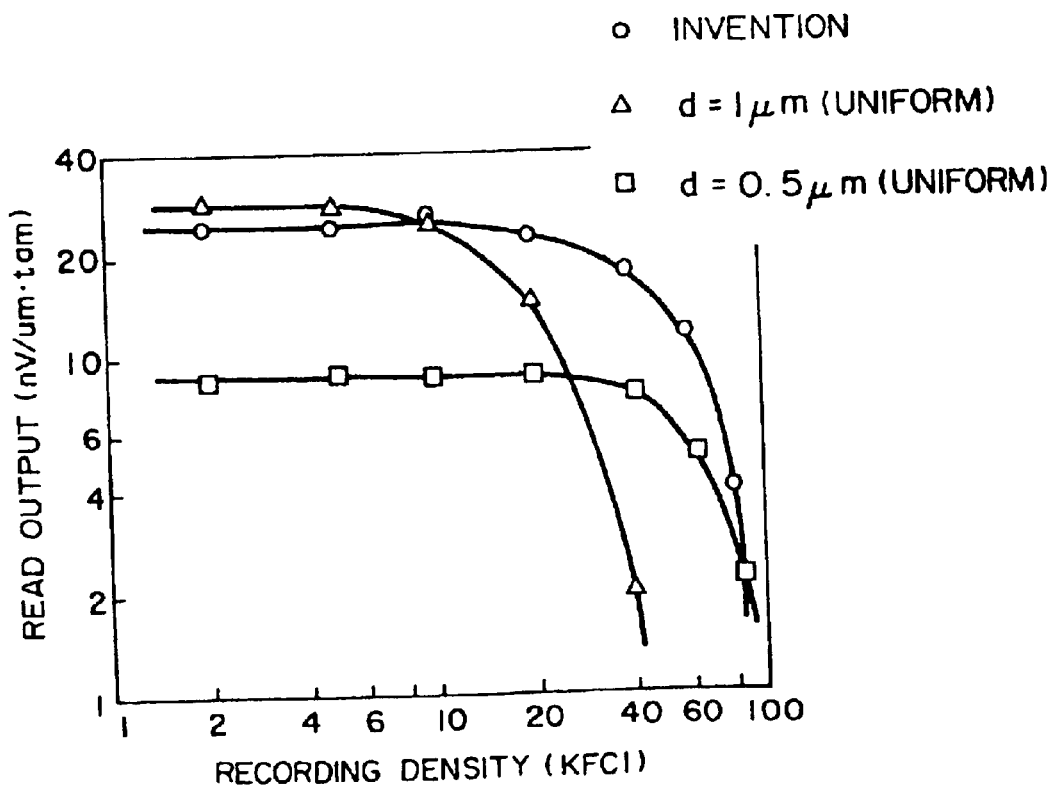
FIG. 18 is a diagram showing the measurement result of characteristics and showing the relation between a write density and a read output in a conventional head and in a head of the present invention, respectively.
Figure 19:
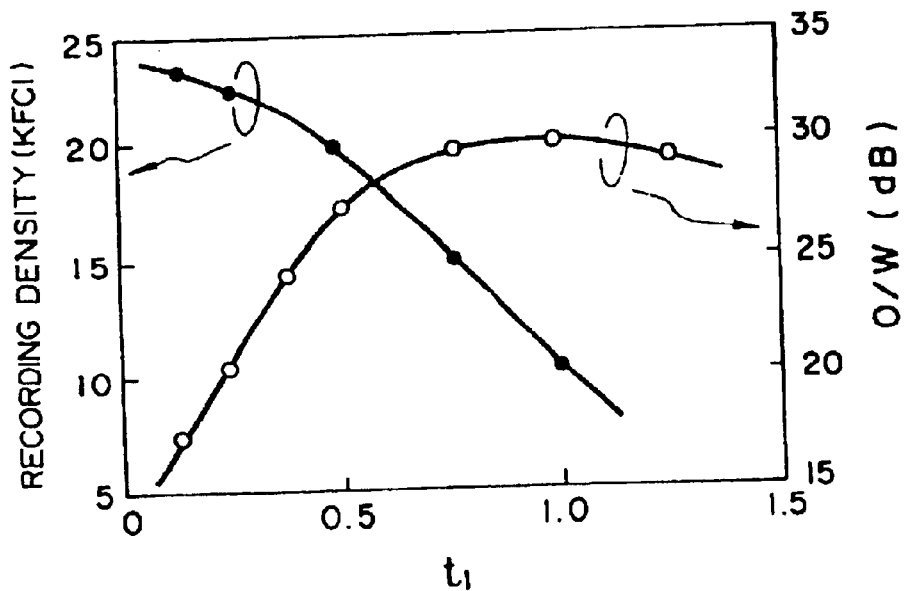
FIG. 19 is a diagram showing the measurement result of characteristics and showing the relation between the width $t_1$ of the tip of a magnetic pole and a write density and between the width $t_1$ and overwrite in the head of the present invention.

FIG. 18 shows the result of the measurement of frequency characteristics when the read/write operations are carried out practically by use of the head having the pole magnetic film of this embodiment and the conventional head having a uniform thickness for the pole magnetic film.

In the conventional head, comparison is made by changing the thickness $d_1$ of the pole magnetic film to 1 μm and 0.5 μm. A γ-Fe$_2$O$_3$ coated medium having a film thickness of 0.4 μm is used as the recording medium and the spacing is 0.3 μm. As shown in the diagram the frequency characteristics are poor in the film whose film thickness $d_1$ is 1 μm and uniform, and the output drops at about 10 kFCI. In the case of the film whose film thickness $d_1$ is 0.5 μm and uniform, the read output drops by about ⅓ in comparison with the head having $d_1$ of 1 μm. In contrast, when the head of this embodiment is used, higher output and higher frequency characteristics can be obtained. For example, the read output is increased by about twice to about thrice at 20–60 kFCI in comparison with the conventional head.

FIG. 7 shows the result of the measurement of the recording density and overwrite performance in the head of this embodiment when the film thickness $t_1$ at the tip of the pole is changed. The read/write condition is the same as described above. The recording density drops when $t_1$ is increased but overwrite performance can be improved. Both recording density and overwrite performance are satisfactory when $t_1$ is from 0.3 to 0.8 μm.

Figure 20:
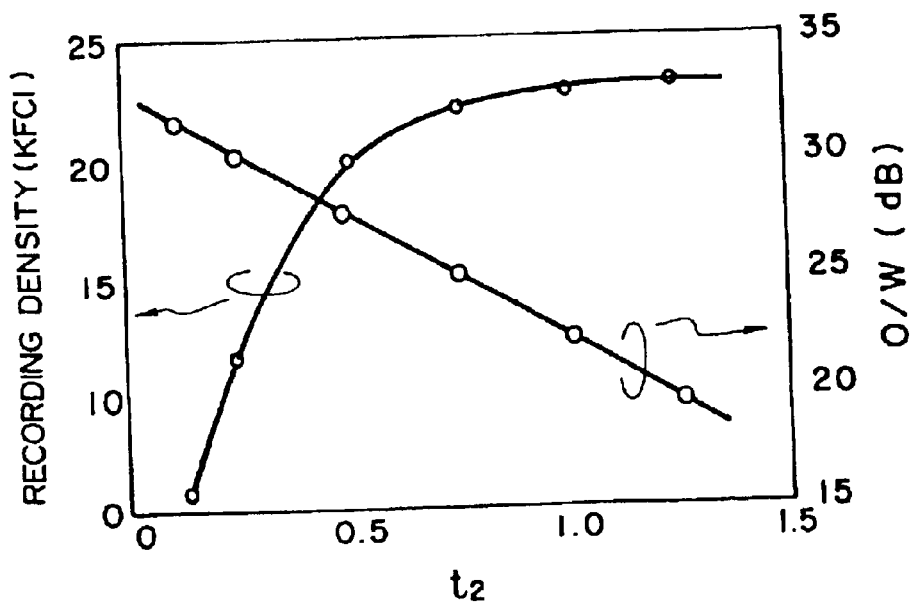
FIG. 20 is a diagram showing the measurement result and showing the relation between an etching depth $t_2$ at the tip of the magnetic pole and a write density and between the etching depth $t_2$ and overwrite.

FIG. 20 shows the result of the similar measurement when the etching depth $t_2$ at the tip of the pole is changed. When $t_2$ is increased, the recording density is improved but overwrite performance drops. Both recording density and overwrite performance are satisfactory when $t_2$ is from 0.3 to 0.8 μm.

Embodiment 12

Figure 16:
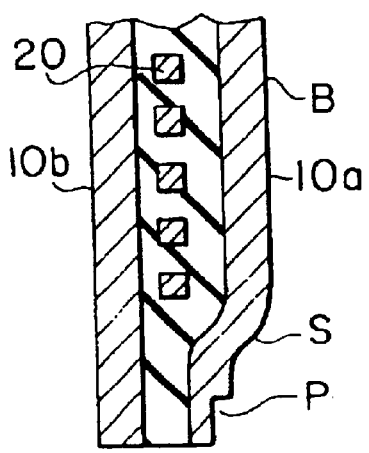
FIGS. 16 and 17 are sectional views of the magnetic core in other embodiments of the present invention, respectively.
Figure 17:
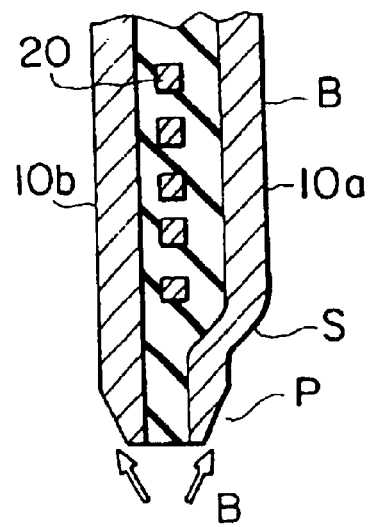

FIGS. 16 and 17 show still another embodiment of the present invention. In the pole magnetic film shown in FIG. 16, only the film thickness at the tip of the upper magnetic film 10a is reduced in the same way as in the head shown in FIG. 14. In the pole magnetic film shown in FIG. 17, on the other hand, FIB is irradiated obliquely from the direction of arrow B, B' so that the film thickness at the tip becomes gradually greater. Since both employ the structure wherein a sharp field is generated from the tip to effect high density recording and the film thickness is sufficiently great in the back region to prevent magnetic saturation, high density magnetic recording can be made highly efficiently.

As described above, the present invention can provide a magnetic head having a simple structure which improve noise characteristics resulting from adjacent tracks. Furthermore, the present invention makes it possible to position the write head and the read head with a high level of accuracy.

Since even a head having a track width of 1 μm or below can be fabricated at a high yield, the present invention is particularly effective for a head for a magnetic disc apparatus which has a large memory capacity and for which high speed transfer of data is necessary.

Since the present invention can provide a thin film magnetic head having a large read output and a high write density, the invention can improve performance of a magnetic memory device.

What is claimed is:
1. A magnetic head comprising:
    a perpendicular magnetic recording head having a lower pole and upper pole; and
    a reproducing head having a magnetoresistive sensor, wherein a magnetic shield material is formed at both ends of the upper pole in a track width direction, and a track width of the reproducing head is smaller than a track width of the perpendicular magnetic recording head.

2. A magnetic head according to claim 1, wherein the track width of the perpendicular magnetic recording head is defined by the magnetic shield material.

* * * * *